United States Patent [19]

Mouly

[11] Patent Number: 4,828,900
[45] Date of Patent: May 9, 1989

[54] DISCRETE GLASS CUTTING AND EDGE SHAPING

[75] Inventor: Raymond J. Mouly, Pittsburgh, Pa.

[73] Assignee: PPG Industries, Inc., Pittsburgh, Pa.

[21] Appl. No.: 137,227

[22] Filed: Dec. 23, 1987

[51] Int. Cl.⁴ .............................................. C03B 21/02
[52] U.S. Cl. ................................ 428/192; 65/97; 65/105; 65/112; 65/174; 65/176
[58] Field of Search ............... 65/97, 112, 174, 176, 65/105; 428/192

[56] References Cited

U.S. PATENT DOCUMENTS

| | | | |
|---|---|---|---|
| 1,339,229 | 5/1920 | Slingluff | 65/97 |
| 1,457,491 | 6/1923 | Beebe . | |
| 1,550,428 | 8/1925 | Corl . | |
| 1,560,077 | 11/1925 | Gelstharp . | |
| 2,243,149 | 5/1941 | Despret . | |
| 3,124,444 | 3/1964 | Ritter, Jr. et al. | 65/25 |
| 3,189,424 | 6/1965 | Brichard et al. | 65/160 |
| 3,193,367 | 7/1965 | Giffen | 65/70 |
| 3,414,454 | 12/1968 | Long | 161/1 |
| 3,414,464 | 12/1968 | Long | 161/192 |
| 3,453,097 | 7/1969 | Hafner | 65/113 |
| 3,486,673 | 12/1969 | Madge | 225/2 |
| 3,512,950 | 5/1970 | Long | 65/182 |
| 3,512,951 | 5/1970 | Long | 65/252 |
| 3,543,979 | 12/1970 | Grove et al. | 225/2 |
| 3,582,454 | 6/1971 | Giffen | 65/105 X |
| 3,584,773 | 6/1971 | Grove et al. | 225/2 |
| 3,587,956 | 6/1971 | Oelke | 225/93.5 |
| 3,690,527 | 9/1972 | Bustraan et al. | 65/176 |
| 3,754,884 | 8/1973 | McDavid et al. | 65/97 |
| 3,843,346 | 10/1974 | Edge et al. | 65/65 |
| 3,875,766 | 4/1975 | French | 65/97 |
| 3,885,943 | 5/1975 | Chui | 65/97 |
| 3,934,995 | 1/1976 | French | 65/97 |
| 3,935,419 | 1/1976 | Lambert et al. | 65/113 |
| 4,139,359 | 2/1979 | Johnson et al. | 65/107 |
| 4,162,907 | 7/1979 | Anderson | 65/29 |
| 4,197,108 | 4/1980 | Frank et al. | 65/273 |
| 4,204,853 | 5/1980 | Seymour | 65/106 |
| 4,361,429 | 11/1982 | Anderson et al. | 65/67 |

FOREIGN PATENT DOCUMENTS

| | | |
|---|---|---|
| 2548748 | 5/1977 | Fed. Rep. of Germany . |
| 2567872 | 1/1986 | France . |
| 535228 | 4/1983 | U.S.S.R. . |
| 628685 | 4/1983 | U.S.S.R. . |

Primary Examiner—Arthur Kellogg
Attorney, Agent, or Firm—Andrew C. Siminerio

[57] ABSTRACT

Glass shapes and sheets are cut directly from a heated glass ribbon while maintaining the optical quality of the cut glass. A float glass ribbon is removed from a glass forming chamber and prior to annealing, a line of cut is heated to its softening temperature. A blade arrangement thereafter penetrates the glass along the heated line of cut to sever the glass. The cut glass edge is shaped after cutting while the edge is still at the softening temperature. Duuring the line heating and cutting operation, the overall glass temperature is maintained above the strain point of the glass.

36 Claims, 4 Drawing Sheets

DISCRETE GLASS CUTTING AND EDGE SHAPING

BACKGROUND OF THE INVENTION

1. Field of the Invention

This invention relates to the cutting of glass sheets and, more particularly, to the cutting of glass sheets from a heated glass ribbon and shaping the cut edge while maintaining the overall optical quality of the cut glass.

2a. Technical Considerations

The fabrication of flat or bent glass products conventionally requires two separate and distinct processes: primary processing and secondary processing.

The primary processing includes forming a glass ribbon from molten glass by either floating the molten glass on a bath of tin or pulling a sheet of glass from a molten glass bath. In the float forming process, them-molten glass is deposited and floated on a molten tin bath to form a ribbon, for example as disclosed in U.S. Pat. No. 3,843,346 to Edge et al. The float glass ribbon starts to cool and its thickness is established while on the tin bath. The ribbon is thereafter lifted off of the tin bath and conveyed into an annealing zone where it is controllably cooled to a temperature below its strain point. In the sheet forming process, the thickness of the glass sheet is established while it is being pulled from the pool of molten glass and is cooled thereafter, for example as disclosed in U.S. Pat. No. 1,339,229 to Slingluff. After annealing, the ribbon is cut into individual glass sheets for subsequent secondary processing.

Secondary processing may include any number of additional glass sheet processing procedures. For example, the large sheets may be cut into smaller, more easily handleable sheets prior to cutting the glass sheet to its final shape. The final shape may be rectangular as in desk tops, glazing units, etc. or maybe more complex as in special glazing designs or automotive windows. After cutting the glass to shape, it may, for example, be drilled, edged, coated and/or bent to shape. The edging operation is generally performed while the glass is at room temperature using one or more grinding wheels to shape and smooth the cut glass edge. This operation may leave small chips in the glass edge that may act as stress concentration points and weaken the edge strength, leading to subsequent failure and breakage. In the shaping operation, the cut glass is reheated to its heat deformable temperature, approximately 1150° F. to 1250° F. (621° C. to 677° C.) for typical soda-lime-silica glass. The heating and shaping operations may be performed in any of a number of different methods as taught, for example in U.S. Pat. Nos. 4,197,108 to Frank et al., 4,204,853 to Seymour, or 4,139,359 to Johnson et al.

After the cold processing and/or heating for bending, the glass may be heat strengthened. In the case of room temperature glass, the glass sheet is reheated to a temperature above its annealing range and then rapidly cooled through the annealing range to its strain point, to impart a temper in the glass sheet. In the case of bent glass, after the bending operation, the glass sheet is rapidly cooled to impart temper.

The present practice of fabricating glass products with acceptable optical quality such as windows, mirrors, and the like requires the practice of the primary and secondary processes. It is apparent that there would be significant cost savings if the primary or secondary process as could be modified or the two processes could be integrated into a single process so as to eliminate certain steps, e.g. reheating, and improve the finished product, e.g., provide a high quality glass edge. There would be additional cost savings if the primary processing included float forming of a glass ribbon so that the glass would have its final glass thickness and optical quality as it is removed from the tin bath without any additional stretching, grinding, or polishing operation.

2b. Patents of Interest

U.S. Pat. Nos. 3,189,424 to Brichard et al.; 3,486,673 to Madge; 3,690,527 to Bustrann et al.; 3,754,884 to McDavid et al.; and 3,875,766 to French teach the severing of a drawn glass ribbon. In each, the glass ribbon is cooled so that a major surface of the glass is susceptible to scoring by a scribing apparatus and subsequently fractured along the scored line.

U.S. Pat. Nos. 1,550,428 to Corl; 1,560,077 to Gelstharp; and 2,243,149 to Despret teach the severing of a glass ribbon in a sheet glass operation while the ribbon is still in a plastic state. In particular, Corl teaches the use of severing ribs along each major surface of the ribbon to "bite into" of the sheet disposed therebetween. In Gelstharp, a cutting wheel mounted on a carriage and movable along the transverse direction of the ribbon is used to sever the still plastic glass sheet ribbon. In Despret, a roller with a knife blade is rotated at a predetermined speed so that the blade cuts the soft glass.

U.S. Pat. No. 3,124,444 to Ritter, Jr. et al. teaches a method for continuously removing the marginal edge or border portions of a moving ribbon of glass while it is in a plastic condition. The pair of circular cutting discs are arranged at the edge of the ribbon so that the ribbon passes therebetween and the edge of the ribbon is cut from the remainder of the ribbon.

French Patent Publication No. 2 567 872 to Diaz et al. teaches a method for cutting glass sheets still in the plastic state. The glass passes over a pair f rotating knives which pinch the glass almost through its entire thickness. A first set of knives are positioned radially around a cutting roll to continuously cut the glass sheet in its longitudinal direction, and a second set of knives are positioned longitudinally along the length of the cutting rolls to periodically cut the glass sheet in the transverse direction.

U.S. Pat. Nos. 3,453,097 to Hafner; 3,543,979 to Grove et al.; 3,885,943 and 3,930,825 to Chui; and 3,935,419 to Lambert et al. teach the cutting of glass with a laser beam. In Hafner, the parameters of the laser are selected so that the glass sheet absorbs the laser energy and converts it into sufficient heat to enable separation of the glass sheet into pieces along a line swept by the laser beam. In Grove, which teaches cutting of glass sheets from a continuous glass ribbon, a laser beam scans the glass to induce a stress field in the glass which causes a controlled fracture along the scanned line. In the Chui patents, lasers are used to vaporize the glass along the cutting line. In U.S. Pat. No. 3,930,825 a pair of lasers are used to cut shaped glass articles directly from a float glass ribbon. It is believed that the power of the laser and the time required by such a laser to vaporize the glass may be prohibitive in a high volume commercial operation. In addition, there is no control of the edge shape.

U.S. Pat. No. 3,934,995 to French teaches a method for cutting sheets from a glass ribbon as it emerges from a float line by subjecting a portion of the ribbon to a controlled quench to cool the glass, scribing the glass along the cooled line, and rapidly breaking the glass along the scribed line.

U.S. Pat. No. 3,193,367 to Griffen teaches a glass forming operation wherein a sheet of softened glass drawn from a molten pool is positioned over a forming die, pressed into the die and severed by shearing elements that separate the glass from the remaining glass sheet during the pressing operation.

U.S. Pat. No. 3,584,773 to Grove teaches a method of cutting glass by employing high frequency dielectric heating of the glass through its thickness to cause a controlled fracture to run along the cutting line.

U.S. Pat. No. 3,687,956 to Oelke teaches a method and apparatus for cutting cooled glass plates by applying heat along a desired line of cut from a source which is spaced from the surface of the plate. The heat from a radiant heat source is restricted to narrow the path corresponding to the line of cut. By concentrating the heat, a large temperature differential is set up between the unheated portions of the glass sheet and the very limited heated area and the coincident stress buildup cases a break through the sheet.

U.S. Pat. No. 4,162,907 to Anderson teaches a method of cutting molten glass on a molten tin bath. An extruder applies the molten glass to the molten tin bath where a cutting frame is lowered over the bath to firmly hold the glass and a cutting mechanism cuts the molten glass into desired sizes. The molten glass is cut with a compressed air driven rotary blade which penetrates completely through the glass and into the molten tin.

U.S. Pat. No. 4,361,429 to Anderson et al. teaches a method and apparatus for forming articles from molten sheet glass. Glass is drawn from a pool of molten glass by a pair of rollers. The molten glass sheet is positioned over and conformed to a mold cavity by a combination of vacuum and/or gravity. While still in a molten condition, the sheet is pressed and cut into a finished article. A vacuum take-out lifts the finished articleoout of the mold.

U.S. Pat. Nos. 3,414,454; 3,414,464; 3,512,950; and 3,512,951 to Long teach the casting of flat glass sheets within a graphite frame on boh a non-wettable flat rigid surface and on molten tin. Molten glass is poured into the frame in an amount such that it reaches an equilibrium thickness while barely contacting the frame so as to maintain a rounded glass edge.

U.S.S.R. Patent Nos. 535228 and 628685 to Glikman et al. teaches casting molten glass on molten tin within a graphite frame. The frame in the former specification is positioned so that the bottom of the frame is at the same level as the bottom of the cast glass. The frame in the latter specification includes an inner element with a curved upper surface to contour the lower glass edge of the cast glass product.

These patents disclose glass casting and cutting techniques, but they are not concerned with cutting and shaping the cut edge of flat glass that has been sufficiently cooled to allow handling of the glass without reducing its optical quality, while minimizing the amount of additional heat that may be required for subsequent processing, i.e. tempering or annealing. In addition, there is no teaching of shaping the cut glass edge while or immediately after cutting so as to provide a strong contoured glass edge.

SUMMARY OF THE INVENTION

The present invention provides an apparatus and method to cut glass and shape its edge while the glass is at a temperature at which it can be handled and resist marking. A zone of glass including a desired line of cut is heated to its softening temperature, i.e., the temperature at which the glass can be penetrated with a cutting device to cut the glass without conventional scoring and fracturing techniques but below the temperature at which glass is vaporized. The heat softened glass is penetrated along the line of cut with cutting blades. The cut edge is then shaped while still at the heat softened temperature.

In one particular embodiment of this invention, the glass is a continuously advancing float glass ribbon. The glass ribbon emerges from a float forming operation so that the final glass thickness and required optical quality are established in the glass as the glass is formed, without any additional processing such as stretching, grinding, polishing, etc. As the glass ribbon is removed from the molten tin in the float forming operation, it is sufficiently rigid to permit handling and conveying without marking or otherwise affecting it optical properties. Throughout the cutting and edge shaping operations, the glass is maintained within a temperature range, such as its annealing range, that permits handling without marking while at the same time minimizing the requirement for additional heat that may be required for further processing, e.g., bending, tempering, annealing, etc. The glass is selectively reheated along a first heating zone, including the desired line of cut, by high temperature flames, or other types of heaters, to its softening temperature and along a second zone on either side of the first zone to at least about the strain point temperature of the glass. The line of cut may be straight, e.g., across the width of this advancing ribbon, or it may be nonlinear and define the perimeter of a glass part to be severed from the ribbon. The heaters are positioned above and below the major surfaces of the glass ribbon and are advanced in the direction of the ribbon conveyance. After the line of cut is heated to the required temperature, a cutting device which may include a blade paralleling the line of cut or opposing rotary blades, penetrate at least a portion of the thickness of the glass ribbon to sever the glass. The cutting blades are advanced in the direction of ribbon conveyance during cutting. The blades include a glass edge forming tool which shapes the cut edge while it is still at the softening temperature. The severed glass piece is transferred away from the advancing glass ribbon and the heaters and cutting device move back to their original positions.

In an additional embodiment of the present invention, glass parts are cut from a stationary glass sheet. A heating pattern is established to form the first and second heating zones. After heating, the sheet may either be advanced to a cutting station where a blade arrangement penetrates at least a portion of the thickness of the glass sheet along the line of cut to sever a glass part, or the glass sheet remains stationery and the heaters are removed from the sheet and the cutting blades are positioned adjacent the sheet to sever the glass part. Glass edge forming tools on the blades shape the cut edge as the glass is cut. The glass part is then removed from the glass sheet and transferred to a subsequent station for additional processing.

In a further embodiment of the invention, stationary heaters are positioned slightly inboard of the bulb edge of an advancing glass ribbon to heat the first and second heating zones. A pair of rotary blades with edge shaping members are aligned downstream from the heaters. The glass ribbon advances to and is cut and edge shaped along the heated line of cut within he first zone to sever the bulb edge and shaping the cut edge. A biasing arrangement forces the bulb edge away from the remaining glass ribbon after it is severed.

DETAILED DESCRIPTION OF THE INVENTION

The present invention is presented with respect to its use in cutting and shaping the edge of a soda-lime-silica float glass ribbon or sheet but it should be appreciated that the invention may be used in any sheet material severing operation and in particular with any type of glass forming operation, glass composition, or glass composite.

In describing the instant invention. reference will be made to certain properties and reference temperatures of the glass. "Annealing point" and "strain point" are defined as the temperatures that correspond either to a specific rate of elongation of a glass fiber when measured by ASTM Method C336 or a specific rate of midpoint deflecting of a glass beam when measured by ASTM Method C598. At the annealing point, internal stresses are substantially relieved in a matter of minutes. At the strain point, internal stresses are substantially relieved in a matter of hours. The range of temperatures between the annealing point and the strain point is called the annealing range. During heat processing of glass, its temperature is lowered slowly (annealing) or quickly (tempering) through the annealing range. For typical soda-lime-silica float glass, the annealing point temperature is generally witin the range of about 1000° F. to 1040° F. (538° C. to 560° C.), the strain point temperature is generally within the range of about 925° F. to 970° F. (496° C. to 521° C.), and the annealing range is about 925° .F to 1040° F. (496° C. to 560° C.). "Float glass optical quality" can be characterized by the optical power of the glass' dominant transmitted defects, reflected defects, and/or surface roughness, depending on the application of the glass. The transmitted and reflected defects, in the form of surface irregularities, generally have a wavelength in the range of approximately 0.50 inches to 2 inches (1.27 cm to 5.08 cm) and an optical power on the order of approximately 30 millidiopters or less. Surface roughness for glass with float quality optics typically has an average roughness of less than 1 microinch (0.015 microns).

In the present invention, the glass is cut in a manner similar to that taught in U.S. Pat. No. 4,749,400 to Mouly et al., which teachings are hereby incorporated by reference.

Figure 1:
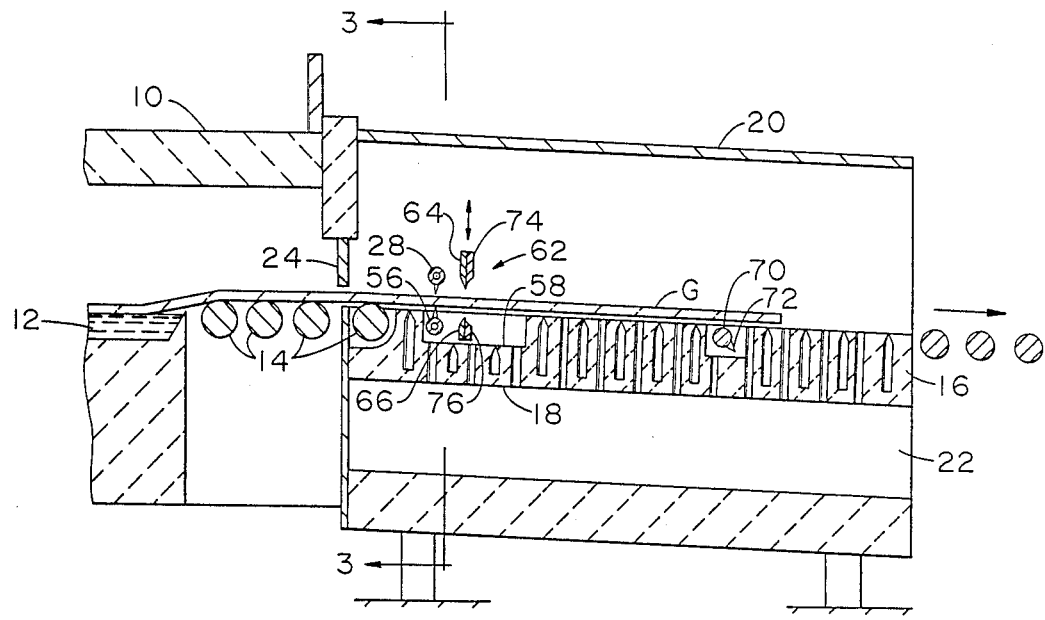
FIG. 1 is a longitudinal cross-sectional view of a preferred embodiment of a float glass ribbon heating, cutting, and edge shaping arrangement incorporating features of the present invention.

FIG. 1 illustrates a float glass ribbon G as it exits a forming chamber 10. Because the ribbon G is a float glass ribbon, it has superior optical qualities and can be used in applications where undistorted viewing through the glass or of the glass is required. The continuous glass ribbon G is removed from a molten metal bath 12, e.g., a molten tin bath, by a series of rolls 14 onto a ribbon support 16 that may include a gas hearth support bed 18 or additional conveyor rolls (not shown) and into an annealing lehr (not shown). Although not limiting in the present invention, the gas hearth support bed 18 is preferably within a temperature controlled chamber 20 to minimize heat loss in the ribbon, for reasons to be discussed later. Bed 18 includes a plenum 22 which forces hot pressurized air to the upper surface of the gas hearth 18 to provide a cushion of air to support the hot glass. Curtain 24 maintains the atmosphere within the forming chamber 10. The chamber 20, where the heating, cutting, and edge shaping operation occurs, is generally within a temperature range of about 950° F. to 1150° F. (510° C. to 621° C.) which is above the float glass annealing point temperature. The glass ribbon in the float glass process within this temperature range is sufficiently rigid so that it may be handled and contacted by the rolls 14 and other conveying equipment without marking so that its optical qualities remain undisturbed.

Figure 2:
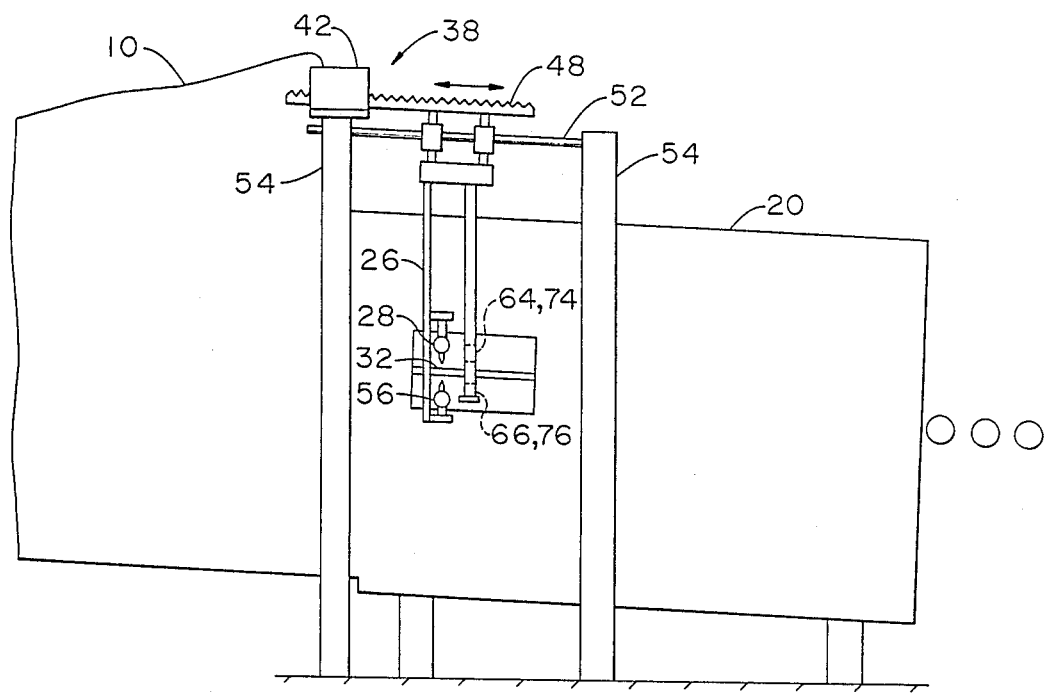
FIG. 2 is a side view of the sliding frame of the present invention illustrated in FIG. 1.
Figure 3:
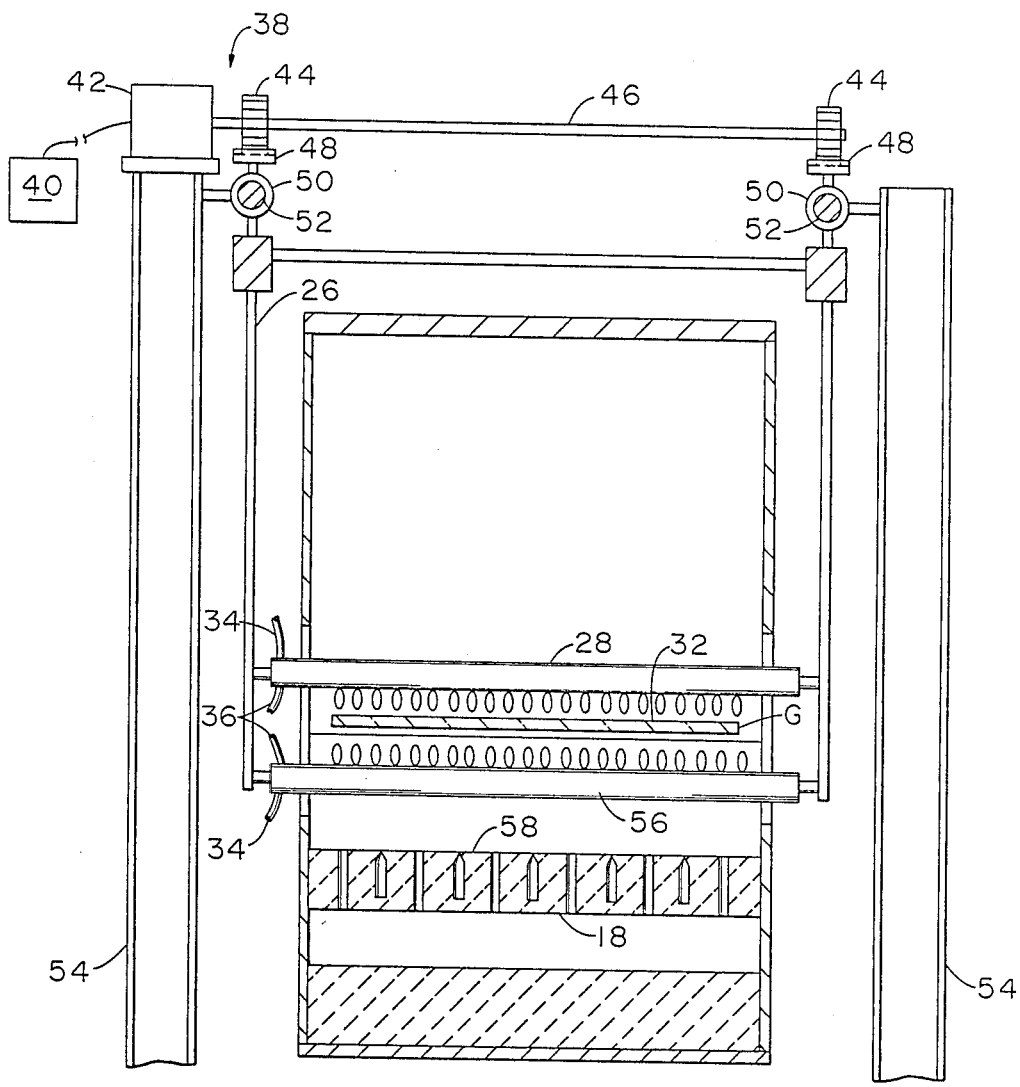
FIG. 3 is a view along line 3—3 of FIG. 1 illustrating the line heater arrangement.

Referring to FIGS. 2 and 3, a support frame 26 supports a heater 28 which extends across the width of the ribbon G. The heater 28 directs concentrated high temperature heat at the hot glass ribbon G to rapidly heat a zone 30, (shown schematically in FIG. 5 only) including a selected line of cut 32, to its softening temperature range as will be discussed later. The width of the zone 30 is sufficient to allow the glass G to be cut along the line of cut 32 and to allow the cut edge to be shaped, as will be discussed later. The heater 28 may be one of any of a number of commercially available heat sources as long as it can provide the required concentrated heat and direct it toward zone 30 and in particular, along line of cut 32. Although not limited in the present invention, in the preferred embodiment, the heater 28 is a line burner that directs high temperature flames along the zone 30 of the ribbon G. Fuel line 34 and oxygen line 36 (optional) supply the burner 28 with necessary combustants to produce a high temperature flame. Heaters such as resistance type heaters, high frequency dielectric heaters, plasma torch heaters, lasers, or electron beam heaters may also be used.

In order to direct the flame from burner 28 along a zone 30 when heating a moving sheet of material, e.g., a moving ribbon G, the frame 26 is provided with a drive arrangement 38 to allow the burner 28 to move at the same speed as the ribbon G. The movement of the frame 26 by the drive arrangement 38 may be controlled in any convenient manner, e.g., a computer 40. After moving in the direction of the ribbon G for the time required to heat zone 30 to the softening temperature range, the frame 26 returns back to its starting position. The drive arrangement 38 should be capable of moving the heater 28 at a speed sufficient to reposition the heater 28 at its starting position as shown in FIG. 1 prior to or at the same time as the next zone 30 including the next line of cut 32 moves below the heater 28. Although not limiting in the present invention, the drive arrangement 38 of the particular embodiment depicted in FIGS. 2 and 3 may include a motor 42 connected to drive sprockets 44 via shaft 46. The sprocket 44 engages gear racks 48 that are attached to slip collars 50 mounted on slide rails 52. The support frame 26 is supported from the collars 50. Columns 54 provide support for the slide rails 52 and motor 42. To move the frame 26, motor 42 turns the drive sprocket 44 which in turn moves the gear racks 48 forward or backward, i.e., left or right as viewed in FIG. 1, along the path defined by the slide rails 52.

Figure 5:
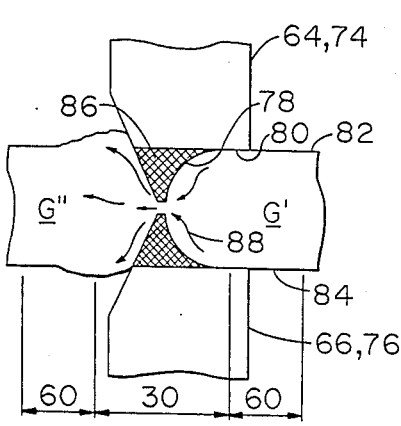
FIG. 5 is a schematic of the view shown in FIG. 4 illustrating a glass heating pattern and glass flow during cutting and edge shaping.

The line burner 28 increases the temperature of the hot ribbon G in the zone 30, and in particular, along the cut line 32 as shown schematically in FIG. 5, preferably to at or above its softening point, i.e., a temperature at which the glass can be penetrated with a cutting device to sever the glass from the remainder of the ribbon without conventional scoring and fracturing techniques but below the temperature at which the glass is vaporized. For typical soda-lime-silica float glass, the softening temperature is generally in the range of abou 1325° F. to 1375° F. (718° C. to 746° C.). If required, in order to increase the speed at which the interior portions of the ribb.on along the line of cut 32 is heated to the softening temperature, a second heater 56 may be positioned below the ribbon G in slot 58 of the gas hearth support 18 and parallel to the heater 28 so as to direct its focus of heat along zone 30 from the lower side. The lower heater 56 would also be provided with a structural support and sliding frame so that the lower heater 56 could move at the same speed as the ribbon G for a distance sufficient so that top and bottom heaters could raise the temperature of the zone 30 to the desired softening point. As shown in FIGS. 1, 2, and 3, in the preferred embodiment of the invention, top and bottom heaters are used and both are mounted on the support frame 26 so that they may be moved simultaneously.

It should be appreciated that the zone 30 can be heated to even higher temperatures but this will require additional power and/or a longer time to heat the glass. In addition, if the glass is heated to too high of a temperature, it may begin to deform and result in a degradation of the optical quality of the final glass product.

Because the line heaters 28 and 56 focus concentrated heat along a narrow band of the glass, there is a possibility of thermal shock in the glass, i.e., the glass may not have sufficient time to redistribute stresses within the glass established by the high temperature, thereby resulting in glass fracturing. To avoid this condition, the glass to be cut should be heated at least to its strain point temperature and preferably to at or above its annealing point temperature so as to relieve any internal stresses resulting from the concentrated heating without fracturing the glass. The entire sheet of glass need not be raised to this elevated temperature but rather only portion of the glass on either side of the zone 30. The width of this zone 60 as shown in FIG. 5, depends on several factors such as the heating system characteristics, the chemical composition of the glass, its strain point, annealing point and softening point temperatures, and the rate at which the temperature of the reheating zone is raised. When the glass to be cut is conveyed directly from a ribbon forming process or when the glass is reheated for bending, the entire sheet is above the annealing point temperature so that the entire width of the sheet is the effective zone 60 that can redistribute the internal stresses. When only a portion of the glass is reheated, the zone 60 must be sufficiently wide to redistribute any thermal stress established by the heaters 28 and 56.

After the selected zone 30 heated to its heat softened temperature and while the zone 60 as well as the remainder of the glass sheet is still at an elevated temperature, the hot ribbon G is cut along the line 32 with a ribbon severing device 62. The ribbon severing device 60 operates by moving a blade or blades through the glass sheet G along the heated line 32. In the particular embodiment of the invention illustrated in FIGS. 1 and 2, the severing device 62 is mounted on the frame 26 and includes an upper blade 64 positioned above the ribbon G and parallel to the heated line and lower blade 66 positioned parallel to and below the blade 64 with the glass ribbon G passing therebetween. The blade 66 is located within slot 58 of gas hearth support 18.

Figure 4:
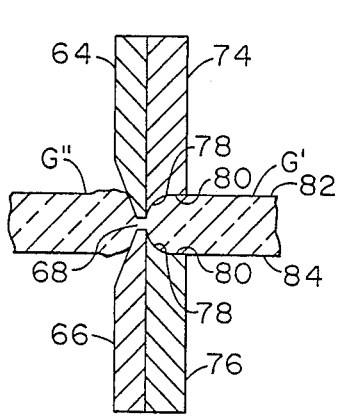
FIG. 4 is an enlarged cross-sectional view of the preferred glass ribbon cutting and edge shaping blade arrangement.

To sever the glass ribbon G, the advancing rate of the frame 26 is slightly reduced so that the preheated line 32 is positioned between the blades 64 and 66. When the line of cut 32 is positioned between the blades 64 and 66, the frame 26 resumes its original advancing rate so that there is no relative movement between the ribbon G and frame 26. Thereafter, the blades 64 and 66 move toward each other to at least partially sever the ribbon G along the preheated line 32 leaving a web member 68 as shown in FIG. 4. The blades may be moved vertically in any convenient manner, such as, for example, hydraulic, pneumatic, or electric activators (not shown). The glass sheet G can thereafter be separated from the remaining glass ribbon by "snapping" the web 68 after the web 68 is cooled to a temperature a which it will fracture. Although not limiting in the present invention in the particular embodiment illustrated in FIG. 1, conveyor roll 70 includes a protuberance 72 and is positioned for example, within gas hearth bed 18. Roll 70 is synchronized to rotate and impact the glass G as the line of cut 32 passes over it with sufficient force to fracture the web 68. The resulting glass edge may include a small nub portion (not shown) that may be removed y a minimal amount of post-cutting processing, or dressing, of the glass edge such as grinding or directing a high temperature flame toward the edge to smooth it. This latter operation is commonly referred to as fire polishing.

Although in the preferred embodiment of this invention, the severing operation occurs while there is no relative movement between the frame 26 and ribbon G, it should be appreciated that some relative movement may be permitted if the cutting action of the blades 64 and 66 is rapid enough to sever the glass without causing any additional optical distortion.

Because the glass in zone 30 on either side of the blades 64 and 66 is at the heat softening temperature, this glass may be shaped. Although not limiting in the present invention in the particular embodiment of the invention illustrated in FIGS. 1 through 3, the blades 64 and 66 include glass edge forming tool members 74 and 76, respectively, to shape the glass edge as the glass is cut as shown in FIGS. 4 and 5. Each tool member 74 and 76 includes a shaping surface 78 and a flat portion 80 positioned coplanar with either to upper surface 82 or lower surface 84 of the glass G' and extending beyond zone 30 along the final glass part G'. The shaping surfaces 78 correspond to the final desired shape of the cut glass edge. Referring to FIG. 5, when cut, a quantity of heat softened glass as indicated by cross hatched area 86 is displaced by the blades 64 and 66 and tool members 74 and 76. Because the glass outside of the zone 30 is rigid, glass portion 86 cannot flow back into glass part G'. Furthermore, since portions 80 of tool members 74 and 76 extend along the upper and lower surfaces of glass part G' beyond zone 30, the glass 86 cannot flow outward along these surfaces. As a result, the heat softened glass 86 is forced to flow through web 68 towards the glass trim G" as indicated by arrows 88. The glass trim G" may be removed from the glass part G', for example by cooling and fracturing the web 68, as discussed earlier.

The blades 64 and 66 do not have to be centered along the line of cut 32. Referring to FIG. 5, the blades may be positioned off-center toward final glass part G' within zone 30 and as close to rigid glass zone 60 as possible while still being able to penetrate the glass. Positioning the blades 64 and 66 off-center reduces the length of surface 80 of tool members 74 and 76 by minimizing the distance over which surface 80 must extend to reach the zone 60.

Although FIGS. 1 through 5 show a cutting and edge shaping arrangement wherein the cutting blades are integral with the edge shaping tool members, it is obvious that separate tool members may be used apart from the blades to shape the cut glass edge. Such tool members (not shown) would parallel the heated and severed line of cut 32 and track the movement of the line of cut 32 on glass G in a manner similar to that discussed earlier with respect to both the heaters 28 and 56 and blades 64 and 66 so that when the severed line of cut 32 is between the tool members, they may operate to shape the heat softened glass edge.

Figure 6:
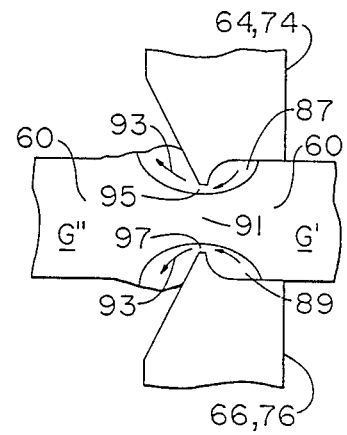
FIG. 6 is a schematic view similar to FIG. 5 illustrating an alternate glass heating pattern and glass flow during cutting and edge shaping.

It has been found that the entire thickness of the glass G along the line of cut 32 need not be at the softening point temperature. Referring to FIG. 6 blades 64 and 66 of severing device 62 penetrate heat softened zones 87 and 89, respectively, which in this embodiment do not extend through the entire glass thickness. Central portion 91 between the zones 87 and 89 is not at the heat softened temperature and preferably it within the same temperature range as adjacent zones 60. Blades 64 and 66 penetrate only a portion of zones 87 and 89, respectively, to allow the glass displaced by the severing devicing 62 to flow away from the finished part as showed by arrows 93 through areas 95 and 97, respectively, as shown in FIG. 6 in a manner as discussed earlier. Tool members 74 and 76 shape the penetrated edge as it is cut by the blades 64 and 76, respectively. After zones 87 and 89 have cooled and solidified, areas 95 and 97 and central portion 91 are fractured to completely sever the glass G' from the trim G" as already discussed.

It should be noted that blades 64 and 66 may cut completely through the glass G, eliminating the web 68 and eliminating the need for roll 70 as discussed earlier. In such a cutting operation, the cut edge may still be shaped as discussed above since the heat softened glass will flow towards the glass trim G" until the blades actually contact each other and fully penetrate the glass G.

To improve their effectiveness, the blades 64 and 66 and tool members 74 and 76 are preferably heat resistant and non-reactive with the glass. In addition, the blades are capable of maintaining a sharp edge so as to reduce maintenance of the blades, e.g., resharping and/or replacement. A high strength material, such as stainless steel may be used for the blades and tool members. Furthermore, if required, the temperature of the blades 64 and 66 and tool members 74 and 76 may be controlled such that each is sufficiently hot so that the glass sheet is not cooled as it is cut and edge shaped but not excessively hot so that the glass sheet sticks to the blades and tool members.

During the severing and edge shaping operations, the severing device 62 moves along with the ribbon G. After the severing and edge shaping operations are complete, the blades retract and frame 26 moves to the left as shown in FIG. 1, back to its original position as the severed glass sheet is conveyed away from the remaining glass ribbon G, for example, but not limiting in the invention, by sloping the gas hearth support block 18 downward, away from the forming chamber 10 so that the severed portion will move away from the remaining glass ribbon G. As an alternative, driven conveyer rolls (not shown) may be used to move the severed glass sheet away from the advancing glass ribbon. In addition, the glass sheet may be transferred by a top vacuum pickup (not shown) that engages the upper surface of the glass sheet G while within chamber 20 and shuttles it to additional stations for subsequent processing, if required.

The present invention, as so far disclosed, has been related to the severing and edge shaping of a moving flat glass ribbon while maintaining its optical quality and in particular, to severing and edge shaping a float glass ribbon and maintaining its float glass optical quality. It should be obvious that similar line heating, severing, and edge shaping techniques may be used on a stationary sheet of flat glass. It is also apparent that the cutting and edge shaping of a glass sheet or ribbon is not limited to cutting along a straight line but rather can be curved or a continuous loop within the outer perimeter of the glass sheet or ribbon as shown in FIGS. 7 and 8.

As discussed earlier with respect to a glass ribbon, in cutting and edge shaping individual glass sheets, portions of the sheet, at least within the cutting zone, must conform to a temperature profile such that the additional heat supplied by a line heater will not crack the glass sheet due to the temperature differential between the heated zone 30 including the line of cut 32 and the surrounding glass. If the glass sheet has been cooled prior to cutting, zone 60 on either side of heat softened glass zone 30 may have to be preheated to at least the strain point temperature of the glass. If the glass sheet is coming directly from a glass forming operation the entire glass sheet is inherently preheated and will not break when additional concentrated heat is directed toward the sheet. In the preferred embodiment of the invention, the temperature of the glass sheet at least within the cutting zone is at least its strain point temperature and preferably at or above its annealing point temperature. This elevated temperature may be maintained throughout the heating, cutting and edge shaping operations by performing these operations in a heated cavity to limit heat loss. It should be noted that if the glass sheet is to be bent and is heated to its bending temperature prior to cutting, for example, 1150° F. to 1250° F. (621° C. to 677° C.) for typical soda-lime-silica float glass, the entire sheet will be at a temperature above the annealing point temperature. In the particular embodiment of the invention illustrated in FIGS. 7, 8, and 9, preheated sheet G is heated along zone 30 at a heating station 90 to its softening point temperature to provide a selected line of cut 32, by top ring burner 92 and bottom ring burner 94. The sheet G is then conveyed to a cutting and edging station 96 and severed and edge shaped along the heated line in a manner as previously discussed, such as, for example, by a cutting device 98 with a blade arrangement similar to that shown in FIG. 4, to form a cut part 100. Conveying between the heating station 90 and the cutting station 96 may be done in any convenient fashion, such as, but not limited to, floating the glass sheet on a downwardly inclined gas hearth support 102 shown in FIG. 7 or by conveyor rolls (not shown) or a vacuum pickup (not shown). Stop member 104 and 106 may be used to position the glass sheet G in the heating station 90 and cutting station 96. As an alternative, the glass sheet G may remain stationary throughout the heating, severing, and edge shaping operations with a line heater and severing-/edging device moving into and out of position as required.

After the heating, severing, and edge shaping steps, the cut glass sheet and the remaining glass, or cullet, are separated. Although not limiting in the present invention, shuttling vacuum pickup with an apertured lower surface conforming to the outline of the cut part 100 may be used to lift the part from the remaining glass and transfer it to the next processing station. In the particular embodiment of the invention illustrated in FIG. 7, a cutting blade 108, edge forming tool member 110 and the vacuum pickup may be incorporated into a single reciprocating and shuttling unit 112 to simplify and combine the cutting, edge shaping, and removing operations. The blade 108 of the unit 112 defines the outline of the cut. The vacuum pickup of the unit 112 draws a vacuum through its apertured lower surface 114 only within the confines of the blade 108 outline so that in operation, the unit 112 moves downward and a lower blade 116 and edge forming tool member 118 reiprocates upward from beneath the glass sheet G to sever the glass sheet G and shape the cut glass edge. The unit 112 then draws a vacuum and moves upward with the cut glass part 100 engaged thereagainst, leaving cullet glass 120 on the gas hearth support 102 to be disposed of in any convenient fashion. The unit 112 then shuttles to the next processing station and deposits the cut shaped glass part 100.

Figure 7:
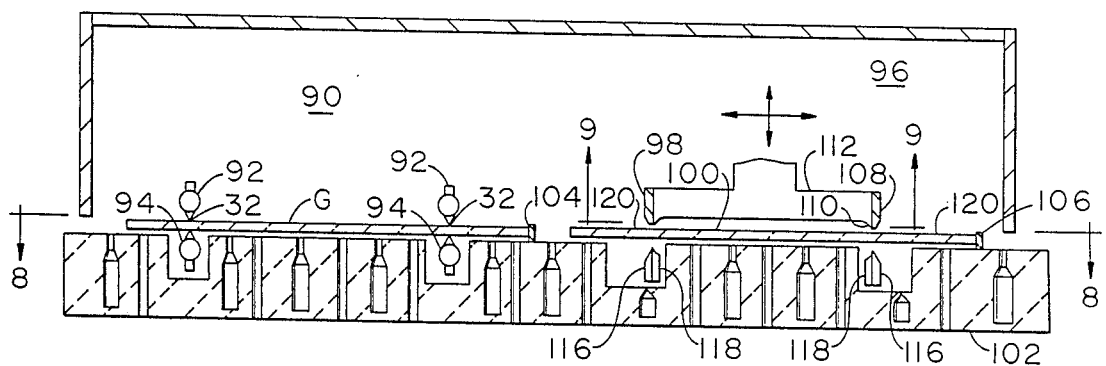
FIG. 7 is a ross-sectional side view of the preferred glass sheet heating, cutting, and edge shaping arrangement incorporating features of the present invention.
Figure 8:
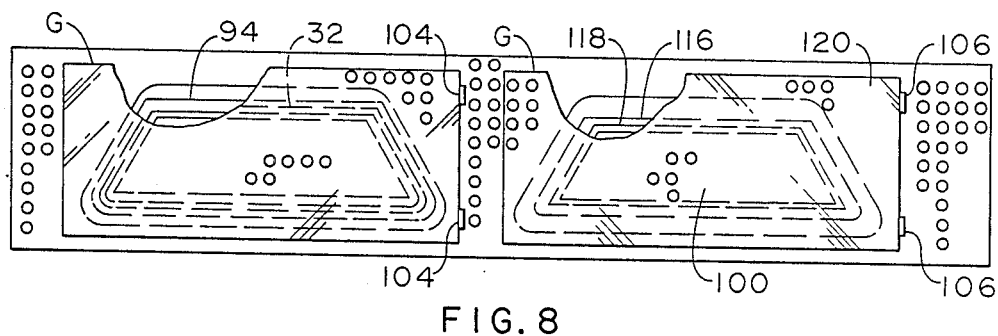
FIG. 8 is a plan view of the arrangement shown in FIG. 7, with portions removed for clarity.
Figure 9:
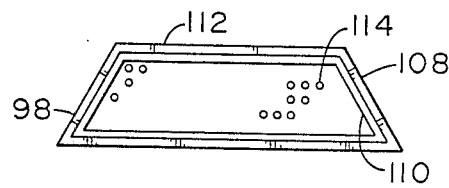
FIG. 9 is a view along line 9—9 in FIG. 7 showing the lower apertured surface of the cutter/vacuum pickup.
Figure 10:
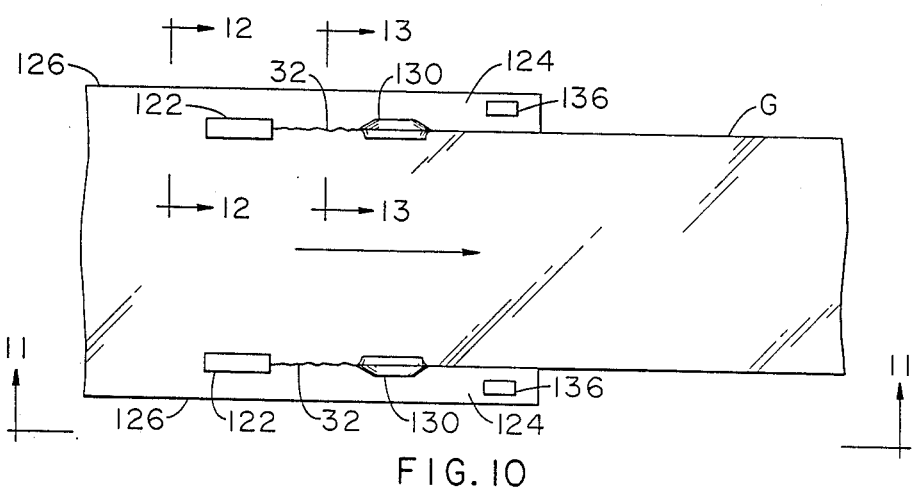
FIG. 10 a plan view of a bulb edge trimming arrangement for a glass ribbon, incorporating glass sheet heating, cutting, and edge shaping features equipment of the present invention, with portions removed for clarity.
Figure 11:
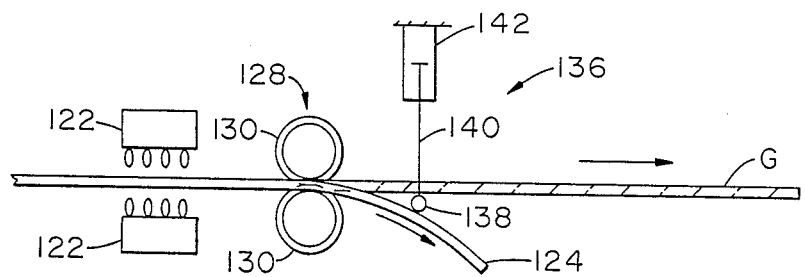
FIG. 11 is an elevational view of the arrangement shown in FIG. 10, with portions removed for clarity.
Figure 12:
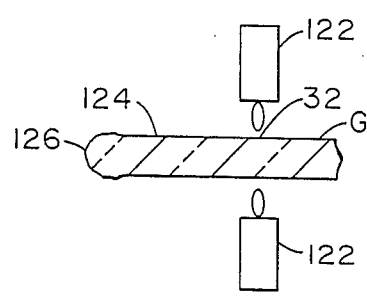
FIG. 12 is a cross sectional view through line 12—12 of FIG. 10 illustrating an opposing pair of heaters along an edge of the glass ribbon.
Figure 13:
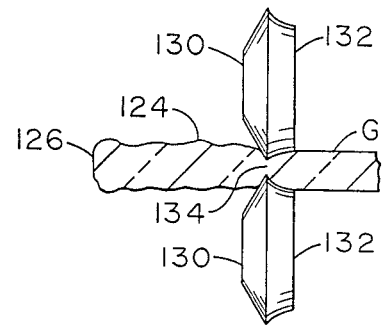
FIG. 13 is a cross sectional view through line 13—13 of FIG. 10 showing a pair of circular cutting blades and edge shaping tools.

It should be appreciated that in the embodiment of the present invention illustrated in FIGS. 7, 8, and 9, when a portion or all of the glass sheet is reheated in order to avoid breakage due to the concentrated heat supplied by the burners 92 and 94, the advantage of minimizing the use of additional heat as is apparent in the embodiment illustrated in FIGS. 1, 2, and 3 is negated. Nevertheless, the novel cutting and edge shaping techniques as taught will still provide a superior cut edge, as will be discussed later.

It is apparent that the technology of the present invention may also be applied to cutting a glass sheet shape directly from a continuously moving ribbon. Moving heaters, severing and edge shaping devices may heat, sever, and shape the cut edge of the glass sheet. A vacuum pickup may preferably move along with the ribbon G to engage the cut shape after severing and edging. The vacuum pickup may be incorporated into the severing/edging tool as already discussed so that the cut and edged glass shape is immediately lifted from the remaining glass ribbon.

The glass severing and edge shaping techniques of the present invention may also be used with other cutting arrangements such as, for example, opposing, circular blades. The blades may be free wheeling so that they rotate due to the cutting action of the blades or the blades may be driven. In the latter arrangement it is preferred that the blades be driven at approximately the same speed at which they would rotate if they were free wheeling. A circular blade arrangement may be moveable so that drawing the blades across the ribbon G cuts and edges the glass. The blades may also be stationary so that the glass ribbon is moved between the blade. The latter arrangement is particularly applicable for removing the bulb edge from a continuously advancing glass ribbon. Referring to FIGS. 10, 11, 12 and 13, stationary line heaters 122 are positioned above, and if required, below, the glass ribbon G along its opter portions 124, slightly inboard of its longitudinal bulb edge 126. The heaters 122 are of sufficient length and intensity such that as the glass ribbon advances from beneath the heaters 122, heated lines 32 are heated to within the glass softening temperature range. The bulb edge 126 is separated from the remaining portion of the advancing glass ribbon by cutting/edge shaping arrangement 128. In the particular embodiment shown in FIGS. 10 through 13, the arrangement 128 includes a pair of rotary blades 130 with edge forming tool members 132, mounted downstream from the heaters 122 and aligned with the heated line 32. As the glass ribbon G advances through the rotary blades 130, bulb edge 126 is at least partially severed from the remaining advancing portion of the glass ribbon G and tool members 132 shape the cut edge. If required, a cooling device may direct cooling fluid along web 134 to fracture it. A biasing device 136, for example, a wheel 138 mounted on arm 140 of a piston 142, or a spring (not shown) may be positioned adjacent to and downstream of the rotary blades to fracture the web 134 and deflect the severed bulb edge 126 away from the remaining ribbon and into a scrap glass collector (not shown). In the particular embodiment of the invention illustrated a FIGS. 10 through 13, the blades 130 partially penetrate the ribbon G, but as discussed earlier, the blades 130 may be positioned so as fully penetrate the glass ribbon.

Referring to FIG. 1, the edge formed by blades 64 and 66 and tool members 76 and 78 is the upstream edge of the downstream portion of glass and the downstream edge of the upstream portion of glass. If desired, both surfaces of the severing device 62 may be contoured so as to shape both sides of the cut edge. The resulting edges will have some slight optical distortion since the glass displaced by the severing device 62 will flow in opposite directions along the cut. It should be appreciated that the shallower the penetration of the glass G along the line of cut 32, the less the optical distortion since there is less glass being displaced by the severing device. As an alternative, a second set of blades and edge forming tool members (not shown) may be positioned at severing device 62 to work in conjunction with blades 64 and 66 and tool members 74 and 76 to make a second cut so that the first cut made by the first severing device is the upstream edge of the downstream glass and the second cut made by the second severing device is the downstream edge of the upstream glass. This cutting arrangement combined with that shown in FIGS. 10 through 13 provides a glass sheet cut from an advancing ribbon with finished edges along all four sides.

The quality of the glass edge resulting from the cutting and edge shaping techniques taught in the present invention are superior to the glass edge formed by conventional scoring and fracturing techniques. The former glass edge will have a smooth, shaped surface. In addition, since it is formed at an elevated temperature, i.e., at least at the strain point temperature, stresses in the glass along the cut line are redistributed and the possibility of venting at the the cut line is reduced. Furthermore, due to the high temperature, the glass may flow and heal any defects in the glass edge before it is cooled. As a result the edge has a higher mechanical strength and is more resistant to thermal stresses than a glass edge formed by conventional scoring and fracturing techniques.

The resulting glass product is also superior to that of cast glass. When molten glass is cast on a support material, it will assume an equilibrium thickness which depends on the density of the molten glass, the support material, and the atmosphere in which the casting is performed and the relative surface tension at each interface. For glass cast on molten tin under normal atmospheric conditions, the equilibrium thickness is approximately 0.69 cm (0.27 inches). As a result, the casting of glass is generally limited to casting at or above the equilibrium thickness.

Figure 14:
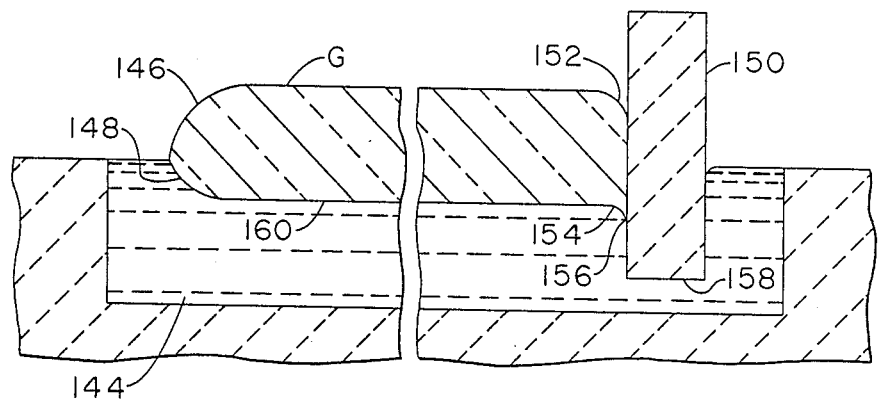
FIG. 14 is a cross-sectional view of a glass casting arrangement for casting molten glass on molten tin.

As the glass flows on the molten tin, there is no positive control of the cross-sectional configuration of the edge as taught in the present invention. In particular, referring to the left hand portion of FIG. 14 the glass G will flow over molten tin 144 and assume an equilibrium thickness. The top edge 146 and bottom edge 148 of the glass G will assume an equilibrium configuration depending on the relationship of the equilibrium glass thickness to the level at which it floats on the tin 144. For glass cast on molten tin, approximately two thirds of the glass thickness is above the tin level. Referring to the right hand portion of FIG. 14, if the glass is cast within a frame 150, as such as a graphite frame, the molten glass will flow, maintaining its equilibrium thickness until it fills the frame 150. The top edge 152 will again assume an equilibrium configuration and the bottom edge 154 will include a tail 156 due to the cohesiveness, or wettng, between the glass G and frame 150. If the frame 150 is non-wetting with respect to the glass, edge 154 will assume an equilibrium configuration similar to top edge 152. The frame 150 may be moved to change the equilibrium configuration of lower edge 154. For example, where the glass G wets the frame 150 as shown in FIG. 14, the frame 150 may be positioned in the tin 144 so that its lower edge 158 will correspond to the lower surface 160 of the cast glass G at equilibrium thickness so as to reduce or eliminate the tail 156, or the frame 150 may be positioned above the lower surface 160 of the glass G to draw the bottom edge 154 upward, but in either case, the top edge 152 will still not be positively shaped to a configuration other than an equilibrium configuration and at least the bottom edge 154 if not both edges, must be processed further to shape the cast glass edge to a final desired configuration. If the further processing is performed after the glass has been cooled, defects such as glass chipping due to grinding the edge may weaken the glass edge strength as discussed earlier.

Glass may be cast on a solid support surface and/or pressed to shape to establish the desired thickness and edge configuration but the molten glass will lose its optical quality as a result of the pressing operation.

Due to the nature of the severing and edge shaping techniques of the present invention, the surface of the glass may be modified so that the original specular quality of the glass may be slightly altered. There may be some optical distortion at the cut and shaped edge due to the blades 64 and 66 and tool members 74 and 76. In addition, there may be some distortion due to heating the zone 30 to the heat softening temperature. As a result, a glass sheet or part cut using the techniques taught in the present invention will maintain its float glass optical quality over the majority of its area with only a slight, if any change in optical quality immediately adjacent its cut edge.

Throughout the heating, cutting, and edge shaping operations disclosed herein, the float glass ribbon and sheets maintain their float glass optical qualities by handling the glass only when the majority of the glass is at a temperature at which the glass can be conveyed and operated on without marking or otherwise affecting its optical properties. If required, additional heat sources (not shown) can be used to maintain the glass sheet at a desired elevated temperature throughout the operations so that the glass can proceed directly to additional processing stations that require such an elevated temperate, e.g., bending and tempering. When the glass ribbon is severed or a glass part is cut from a glass sheet or ribbon as the ribbon leaves the float bath, and the temperature of the glass is maintained preferably above the glass annealing point temperature, any reheating of the glass required for bending and/or heat treatment is greatly reduced if not eliminated. As described, a glass part may be cut from the ribbon as it leaves the float bath, without the cooling required for scoring, and conveyed to additional processing stations at its elevated temperature without the additional steps of annealing the glass ribbon, cutting the ribbon into large blanks, storage of the blanks, reconveying the blanks, cutting shapes from the blanks to a desired configuration and reheating the cut shapes for bending, tempering, or annealing operations as is typical in conventional glass forming and shaping operations. In addition, the cut edge of the glass will have superior edge strength and will be shaped to a desired configuration without the need for additional grinding, edging or other processing of the edge. Also, the final cut glass part will have maintained the superior optical quality it had when it was initially removed from the tin in a float glass forming operation.

The forms of this invention shown and described in this disclosure represent illustrative embodiments and it is understood that various changes may be made without departing from the scope of the invention as defined in the following claims.

I claim:

1. A method of severing glass along a selected line of cut while maintaining its optical properties comprising:
   heating a zone of said glass to or above its softening temperature, wherein said line of cut is within said said zone;
   maintaining glass portions outside of said zone at a temperature at which said glass portions are sufficiently rigid to be handled without marking or otherwise adversely affecting its optical properties;
   dividing said glass along said heated line of cut to provide a glass edge; and
   shaping said glass edge to a predetermined configuration during said dividing step.

2. The method as in claim 1 wherein said heating step includes heating a first zone of said glass to or above its softening temperature, wherein said line of cut is within said first zone, and heating a second zone of glass on either side of said first zone to at least about the strain point temperature of said glass.

3. The method as in claim 2 wherein said establishing step includes directing heat from a heating device to heat said first zone to at least approximately 1300° F. (704° C.).

4. The method as in claim 3 wherein said dividing step includes penetrating at least a portion of the thickness of said glass along said line of cut with a pair of opposing blades positioned along opposing major surfaces of said glass to divide said glass into a trim glass portion and a main glass portion.

5. The method as in claim 4 wherein said shaping step includes providing edge shaping members, displacing a portion of said heat softened glass of said first zone as said blades penetrates said glass and said edge shaping members shape said glass edge, and flowing said displaced glass to said trim portion of said glass.

6. The method as in claim 5 including means to separate said trim glass portion from said main glass portion.

7. The method as in claim 6 including means to dress said glass edge.

8. The method as in claim 5 wherein said directing, dividing, and edge shaping steps includes directing heat, dividing said glass ribbon, and shaping said edge along a nonlinear line of cut.

9. The method as in claim 8 wherein said glass is an advancing continuous glass ribbon and further including the step of members in the conveyed direction of said glass ribbon during said heating, dividing, and edge shaping steps, respectively.

10. The method as in claim 9 wherein said glass ribbon is a float glass ribbon.

11. The method as in claim 5 wherein said glass is a glass sheet and further including the step of moving said heating device into close proximity to said major surface of said glass sheet to perform said heating step and thereafter removing said heating device and moving said blade and edge shaping members into close proximity to said major surface of said glass sheet to perform said dividing and edge shaping steps.

12. The method as in claim 5 wherein said glass is a glass sheet and further including the step of advancing said glass sheet from a heating station after said heating step to a cutting station for said dividing and edge shaping steps.

13. The method as in claim 5 wherein said heating step includes heating said first and second zones along an inboard portion of a longitudinally extending edge of an advancing glass ribbon wherein said line of cut on said ribbon within said first zone advances relative to said heating device, and said dividing step includes passing said advancing ribbon between a pair of rotating circular blades aligned with said advancing line of cut to sever said ribbon edge.

14. The method as in claim 13 further including the step of biasing said severed edge away from said remaining glass ribbon.

15. A glass article made by the method recited in claim 1.

16. A glass article made by the method recited in claim 5.

17. A glass article made by the method as recited in claim 10.

18. A glass article made by the method as recited in claim 14.

19. An apparatus for shearing glass along a selected line of cut while maintaining the optical properties of said glass comprising:
   means to support said glass;
   means to heat a zone of said glass to or above its softening temperature wherein said line of cut is within said zone;
   means to maintain glass portions outside of said zone at a temeprature at which said glass portions are sufficiently rigid to be handled without marking or otherwise affecting its optical properties;
   means to divide said glass along said line of cut to provide a glass edge; and
   means associated with said dividing means to shape said glass edge to a predetermined configuration while said edge is at or above said softening point temperature.

20. The apparatus as in claim 19 wherein said heating means includes means to heat a first zone of said glass to or above its softening temperature wherein said line of cut is within said first zone, and means to heat a second zone of said glass or either side of said first zone to at least about the strain point temperature of said glass.

21. The apparatus as in claim 20 wherein said heating means includes a hating device to direct heat towards at least one major surface of said glass to heat at least said first zone of glass.

22. The apparatus as in claim 21 wherein said dividing means includes a pair of opposing blade members positioned with the major surfaces of said glass therebetween, and further including means to move said blades relative to each other to penetrate at least a portion of the thickness of said glass along said line of cut and divide said glass into a trim glass portion and a main glass portion.

23. The apparatus as in claim 22 wherein said edge shaping means includes glass edge shaping members secured to each of said blades, having a shaping surface corresponding to a portion of the desired shape of said glass edge such that said shaping members shape said edge as said blades penetrates said glass.

24. The apparatus as in claim 23 wherein said shaping members include a surface extending along a portion of the major surfaces of said main glass portion, beyond said first zone of glass.

25. The apparatus as in claim 24 further including means to fully separate said trim portion from said main glass portion.

26. The apparatus as in claim 25 further including means to dress said glass edge.

27. The apparatus as in claim 24 wherein said glass is an advancing continuous glass ribbon and further including means to advance said heating device in the advancing direction of said ribbon.

28. The apparatus as in claim 27 further including means to advance said blades and said glass edge shaping members in the advancing direction of said ribbon.

29. The apparatus as in claim 28 wherein said heating device and blades are mounted on a common movable support frame.

30. The apparatus as in claim 28 wherein said blades generally parallel at least a portion of said line of cut.

31. The apparatus as in claim 30 wherein said line of cut is nonlinear.

32. The apparatus as in claim 23 wherein said glass is a glass sheet and further including means to position said sheet relative to said heating device to heat said sheet along said line of cut to its softening point temperature and means to position said heated sheet relative to said blades and edge shaping means so as to allow said blades to at least partially penetrate the thickness of said sheet along said line of cut and to shape said cut edge.

33. The apparatus as in claim 32 wherein said line of cut is nonlinear.

34. The apparatus as in claim 23 wherein said heating device positioned inboard of the longitudinal edge of an advancing glass ribbon to heat said first and second zone along said longitudinal edge of said advancing ribbon.

35. The apparatus as in claim 34 wherein said pair of blades include a pair of circular blades aligned downstream from said heating device along each of said line of cut, said blades rotating about an axis generally transverse to the advancing direction of said ribbon wherein said line of cut on said ribbon advances between said blades to penetrate at least a portion of the thickness of said ribbon to form said main glass portion and said trim portion.

36. The apparatus as in claim 35 further including means to bias said trim portion away from said main glass portion.

* * * * *

UNITED STATES PATENT AND TRADEMARK OFFICE
CERTIFICATE OF CORRECTION

PATENT NO.  : 4,828,900
DATED       : May 9, 1989
INVENTOR(S) : Raymond J. Mouly It is certified that error appears in the above-identified patent and that said Letters Patent is hereby corrected as shown below:

Claim 3, line 1, delete "establishing" and insert --heating--

Claim 9, line 3, after "step of" insert --advancing said heating device, said blades, and said edge shaping--.

Claim 19, line 9, delete "temeprature" and insert --temperature--

Claim 21, line 2, delete "hating" and insert --heating--.

Signed and Sealed this

Twelfth Day of June, 1990

Attest:

HARRY F. MANBECK, JR.

*Attesting Officer*   *Commissioner of Patents and Trademarks*